United States Patent [19]

Takeo

[11] Patent Number: 4,983,835
[45] Date of Patent: Jan. 8, 1991

[54] METHOD FOR DETECTING PROSPECTIVE CONTOUR POINTS OF AN IRRADIATION FIELD

[75] Inventor: Hideya Takeo, Kanagawa, Japan

[73] Assignee: Fuji Photo Film Co., Ltd., Kanagawa, Japan

[21] Appl. No.: 324,884

[22] Filed: Mar. 17, 1989

[30] Foreign Application Priority Data

Mar. 19, 1988 [JP] Japan .................................. 63-66735
Mar. 19, 1988 [JP] Japan .................................. 63-66736

[51] Int. Cl.⁵ .......................................... G01N 23/04
[52] U.S. Cl. ............................... 250/327.2; 250/484.1
[58] Field of Search ............... 250/327.2 G, 327.2 C, 250/484.1 B; 382/48, 22; 364/413.13

[56] References Cited

U.S. PATENT DOCUMENTS

4,804,842  2/1989  Nakajima .................... 250/327.2 G
4,806,759  2/1989  Funahashi .................... 250/327.2 G Primary Examiner—Janice A. Howell
Assistant Examiner—Richard Hanig
Attorney, Agent, or Firm—Sughrue, Mion, Zinn, Macpeak & Seas

[57] ABSTRACT

A method for detecting prospective contour point of an irradiation field comprises the steps of detecting an image signal representing a radiation image from a recording medium which has been exposed to radiation over a limited irradiation field in order to record the radiation image thereon, and obtaining digital image signal components corresponding to image information stored at respective positions on the recording medium from the image signal. A characteristic value which represents the characteristics of the distribution of the values of the digital image signal components representing image information stored on a single line on the recording medium is calculated. A predetermined threshold value is adjusted on the basis of the characteristic value, and differentiation processing of the digital image signal components is carried out along the line. A point, for which the absolute value of a corresponding differentiated value obtained by differentiation processing exceeds the threshold value, is detected as a prospective contour point of the irradiation field.

6 Claims, 8 Drawing Sheets

METHOD FOR DETECTING PROSPECTIVE CONTOUR POINTS OF AN IRRADIATION FIELD

BACKGROUND OF THE INVENTION

1. Field of the Invention

This invention relates to a method for detecting a prospective contour point of an irradiation field on a recording medium in order to recognize where an irradiation field lies on a recording medium in the course of reading out a radiation image which has been recorded on the recording medium such as a stimulable phosphor sheet.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, which is used when the radiation image of the object is reproduced as a visible image on a recording material such as photographic film, a display device such as a cathode ray tube (CRT), or the like.

In the aforesaid radiation image recording and reproducing systems, in order to eliminate various problems caused by variations in the image input information and/or to obtain a radiation image having a good image quality which can serve as an effective tool in the efficient and accurate diagnosis of an illness, it is desirable to ascertain the characteristics of the image input information before the radiation image is reproduced as a visible image so that the read-out gain can be adjusted to an appropriate value. The characteristics of the image input information depend on the conditions under which an image is recorded, such as the level of the radiation dose used when the image was recorded, on the image input pattern which is determined by what portion of an object (e.g. the chest or the abdomen of a human body) is recorded and o the image recording method used such as plain image recording or contrasted image recording. Determining the characteristics of the image input information will hereinafter simply be referred to an "ascertaining the image input information". It is also desirable to adjust the scale factor in accordance with the contrast in the image input pattern in order to optimize the resolution of the reproduced image.

The method as disclosed in U.S. Pat. No. 4,527,060 may be used to ascertain the image input information before the visible image is reproduced. In the disclosed method, a preliminary read-out operation (hereinafter referred to as "preliminary read-out") is carried out to ascertain the image input information of a radiation image stored on a stimulable phosphor sheet. During the preliminary read-out stimulating rays are used which have an energy level lower than the energy level of the stimulating rays used in a read-out operation (hereinafter referred to as "final read-out") which obtains a visible image which can be viewed and used, particularly for diagnostic purposes. After the preliminary read-out is completed, the final read-out is carried out. In the final read-out, the read-out gain and/or the scale factor are adjusted to an appropriate value, and/or appropriate signal processing of the image signal is conducted, on the basis of the image input information obtained during the preliminary read-out.

Various methods may be used for approximately ascertaining the image input information of the image stored on the stimulable phosphor sheet from a preliminary read-out image signal obtained during the aforesaid preliminary read-out. One method is to utilize a histogram of the preliminary read-out image signal. Specifically, the image input information can be ascertained from, for example, a characteristic value such as the maximum signal value, the minimum signal value, or a signal value which occurs most frequently, i.e. the signal value corresponding to the maximum value of the histogram. Therefore, a visible radiation image having an improved image quality, which makes it a particularly effective tool in the accurate and efficient diagnosis of illness, can be reproduced by adjusting the read-out conditions such as the read-out gain and the scale factor and/or the image processing conditions on the basis of the histogram.

On the other hand, in the course of radiation image recording, it is often desirable for portions of the object not related to a diagnosis or the like to be prevented from being exposed to radiation. Further, when the object portions not related to a diagnosis or the like are exposed to radiation, the radiation is scattered by such portions to the portion that is related to a diagnosis or the like, and the contrast and resolution are adversely affected by the scattered radiation. Therefore, in many cases, when a radiation image is recorded, the irradiation field is limited to an area smaller than the overall recording region on the stimulable phosphor sheet.

Figure 2:
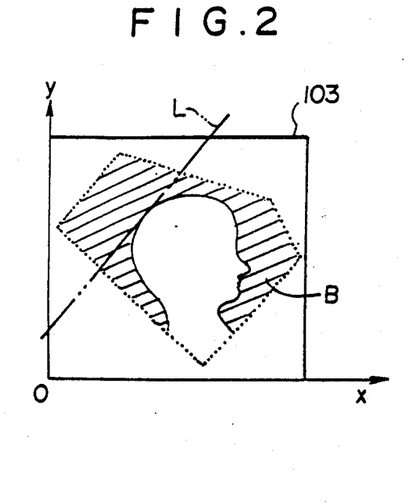
FIG. 2 is an explanatory view showing the state of a radiation image stored on a stimulable phosphor sheet.

However, in cases where the image input information stored on the stimulable phosphor sheet is ascertained in the manner described above, the problem as described below arises. FIG. 2 is an explanatory view showing the state of a radiation image stored on a stimulable phosphor sheet. With reference to FIG. 2, when an irradiation field B is limited to an area smaller than the image recording region on a stimulable phosphor sheet 103 and a preliminary read-out is carried out over an area markedly larger than the irradiation field B, for example, over the overall region of the stimulable phosphor sheet 103, the image input information actually stored within the irradiation field B is ascertained incorrectly. Specifically, in the aforesaid cases, since parts of the preliminary read-out image signal at regions outside of the irradiation field B are also included in a histogram of the preliminary read-out image signal, the histogram does not accurately represent the actual image input information of the image stored within the irradiation field B.

The applicant has proposed various methods for recognizing an irradiation field as disclosed in, for example, U.S. Patent application Ser. No. 760,862 now U.S. Pat. No. 4,851,678. The proposed methods allow the aforesaid problem to be eliminated by recognizing where the irradiation field lies on the stimulable phosphor sheet, and carrying out the final read-out only on the region thus recognized.

In general, in the disclosed methods for recognizing an irradiation field, several points which are considered to be present on a contour of the irradiation field, i.e. several prospective contour points, are detected. Thereafter, the straight lines or curves connecting the prospective contour points are detected, and the region surrounded by the straight lines or curves is recognized as the irradiation field.

A novel method for detecting a prospective contour point has been proposed in, for example, U.S. Patent application Ser. No. 4,851,678. The proposed method comprises the steps of detecting light emitted by the stimulable phosphor sheet when it is exposed to stimulating rays and thus obtaining an image signal, sampling and digitizing the image signal so that a digital image signal component represents the image information at each position of a predetermined number of positions on the stimulable phosphor sheet, and carrying out differentiation processing of the digital image signal components representing image information stored at positions located along a single line on the stimulable phosphor sheet. Points at which the absolute value of the differentiated values obtained during the differentiation processing exceed a predetermined threshold value are detected as prospective contour points. In cases where several such points are present, the point nearest to an edge of the stimulable phosphor sheet is detected as a prospective contour point. In the proposed method, if digital image signal components carrying information about positions on the stimulable phosphor sheet are obtained, it is necessary to define what area each position on the stimulable phosphor sheet cavers. The areas corresponding to each position may be defined as covering a single picture element. Alternatively, a plurality of picture elements having a predetermined relation to one another, for example, three to five picture elements standing side by side in a predetermined direction, may be defined as the area corresponding to a single position. In the former case, the term "digital image signal component at each position" means the image signal components obtained by digitizing the image signal levels at the picture elements which correspond to said positions. In the latter case, the term "digital image signal component at each position" means the image signal components calculated on the basis of the image signal levels at a plurality of the picture elements which are included in the areas corresponding to said position, for example, the digital image signal component obtained by averaging the image signal levels at a plurality of the picture elements which are included in the area corresponding to said position. In the latter case, the value of the digital image signal component at each position is defined by carrying out pre-processing (linear or non-linear filtering) of the image signal levels corresponding to respective picture elements, for example, by carrying out one-dimensional smoothing of the image signal levels corresponding to the respective picture elements located at intervals of three to five lines on the stimulable phosphor sheet.

The type of differentiation processing carried out on the digital image signal components at respective positions may be one-dimensional differentiation of first or higher order, or may be two-dimensional differentiation of first or higher order. If the image has been discretely sampled, differentiation is equivalent to the calculation of the difference between neighboring image signal components.

The values of the aforesaid digital image signal components are proportional to the energy levels of the radiation which impinged upon a stimulable phosphor sheet. Therefore, in general, image signal components outside of an irradiation field have low quantum levels, and image signal components inside of the irradiation field have high quantum levels. Accordingly, in general, the difference between the image signal components corresponding to a portion (an edge portion) of the radiation image containing the contour of the irradiation field has a quantum level higher than the quantum level of the difference between the image signal component corresponding to other portions of the radiation image. A prospective contour point can be detected on the basis of the value of the difference between the image signal components.

The method, wherein a prospective contour point of an irradiation field is detected by carrying out differentiation processing as described above, is applicable to an irradiation field of any shape, and is therefore practically advantageous. However, in cases where a comparatively high level of energy from scattered radiation has been stored in a region outside of an irradiation field on a stimulable phosphor sheet, prospective contour points are often detected incorrectly. Specifically, at the region where energy from scattered radiation has been stored, the differentiated values obtained by the differentiation processing described above increase or decrease sharply at a certain point. Such a point is located nearer to the edge of the stimulable phosphor sheet than the points on the contour of the irradiation field. Therefore, such a point is readily detected incorrectly as a prospective contour point. Such problems arise also when a radiation image is read out from a recording medium other than a stimulable phosphor sheet.

SUMMARY OF THE INVENTION

The primary object of the present invention is to provide a method for accurately detecting a prospective contour point of an irradiation field by carrying out differentiation processing on image signal components.

Another object of the present invention is to provide a method for detecting a prospective contour point of an irradiation field, which enables a visible radiation image having good image quality to be reproduced, which, in particular, makes the visible image effective as a tool in the accurate and efficient diagnosis of an illness.

The first method for detecting a prospective contour point of an irradiation field in accordance with the present invention is characterized in that differentiation processing is carried out on the image signal components corresponding to positions located in lines on a stimulable phosphor sheet, and the differential values thus obtained are compared to a threshold value, which for each line is adjusted to be suitable for the values of the image signal components corresponding to that line.

Specifically, the present invention provides a first method for detecting a prospective contour point of an irradiation field, which comprises the steps of:

(i) detecting an image signal representing a radiation image from a recording medium which has been exposed to radiation over a limited irradiation field in order to record the radiation image thereon, (ii) sampling and digitizing the image signal to obtain digital image signal components representing the image information at respective positions on said recording medium, (iii) calculating a characteristic value which represents the characteristics of the distribution of the values of the digital image signal components corresponding to positions located along a single line on said recording medium, (iv) adjusting a predetermined threshold value on the basis of said characteristic value, (v) carrying out differentiation processing on the digital image signal components corresponding to positions located along single said line, and (vi) finding the absolute value among the values resulting from the carrying out of the differentiation processing on said digital image signal components which exceeds said threshold value and detecting the point on said recording medium associated with the absolute value exceeding said threshold value as a prospective contour point of the irradiation field.

As the characteristic value, it is possible to employ the maximum value among the absolute values of the differentiated values, the variance of the differentiated values, the variance of the digital image signal components, or the like.

As described above, the values resulting from carrying out differentiation processing on image signal components increase or decrease sharply at portions of the radiation image which were exposed to scattered radiation. The absolute value of a differentiated value obtained from the digital signal components corresponding to such portions of the radiation image is not so large as the absolute value of a differentiated value obtained from image signal components corresponding to a contour portion of the irradiation field. Therefore, based on the aforesaid characteristic value, it is possible to adjust the threshold value so that the absolute value of the differentiated value of image signal components at a contour portion of the irradiation field can be discriminated from the absolute values of the differentiated values at other regions of a recording medium.

With the first method for detecting a prospective contour point of an irradiation field in accordance with the present invention, the threshold value is adjusted to be suitable the digital image components on which differentiation processing is carried out and which correspond to positions lying in a single line on said recording medium. Therefore, a prospective contour point of the irradiation field can be detected accurately without being adversely affected by scattered radiation which impinged upon a region of the recording medium outside of the irradiation field in the course of image recording. Accordingly, because the irradiation field is accurately recognized, the image input information can be ascertained accurately, factors affecting the values of the signal obtained from the final read-out can be adjusted to appropriate values, and an appropriate type of image processing can be carried out. As a result, it is possible to reproduce a visible radiation image having good image quality, which makes it particularly effective as a tool in the accurate and efficient diagnosis of an illness. Also, with the first method for detecting a prospective contour point of an irradiation field in accordance with the present invention, a prospective contour point of an irradiation field can be detected reliably when the irradiation field has an irregular shape. Therefore, the shape of the irradiation field need not be limited to a predetermined shape in the course of radiation image recording, and no limitation is imposed on the image recording conditions, so that the image recording operations are facilitated.

The present invention also provides a second method for detecting a prospective contour point of an irradiation field, which comprises the steps of:

(i) detecting an image signal representing a radiation image from a recording medium which has been exposed to radiation over a limited irradiation field in order to record the radiation image thereon, (ii) from said image signal, detecting digital image signal components at respective positions on said recording medium, (iii) carrying out differentiation processing on the digital image signal components corresponding to positions located along a single line on said recording medium, (iv) detecting the point nearest to an edge of said recording medium among the points, associated with differentiated values obtained from the differentiation processing, which differentiated values have a predetermined positive or negative sign and the absolute values of which exceed a first threshold value, as a prospective contour point of the irradiation field, (v) judging whether a point, associated with a differentiated value having a sign inverse to said predetermined sign and the absolute value of which exceeds a second threshold value, is or is not nearer to said edge of said recording medium along single said line than said point which has been detected as a prospective contour point of the irradiation field, and (vi) in cases where the point, for which the corresponding differentiated value has a sign inverse to said predetermined sign and the absolute value of which differentiated value exceeds a second threshold value, is judged to be nearer to said edge, making a correction so that the point second nearest to said edge of said recording medium among the points for which the corresponding differentiated values obtained from the differentiation processing have said predetermined sign and the absolute values of which differentiated values exceed said first threshold value, is detected as a prospective contour point of the irradiation field.

A comparatively high level of energy from scattered radiation is often stored in the region outside of an irradiation field on a stimulable phosphor sheet, and the image of a lead marker or the like is often recorded in the same region. The lead marker is generally used to adjust the relative positions of a plurality of radiation images stored on a plurality of stimulable phosphor sheets when a subtraction processing method is carried out. Also, besides the lead marker, lead characters, which indicate the various types of information stored on a stimulable phosphor sheet, are often recorded in the region outside of an irradiation field.

Figure 16A:
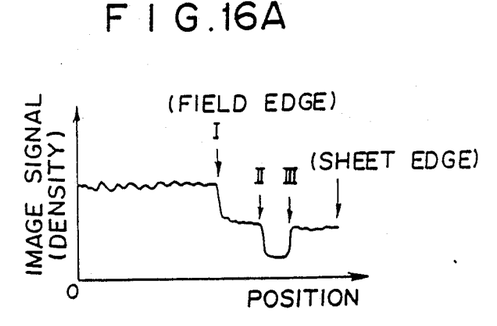
FIG. 16A is a graph showing the distribution of image signal components when the image of a foreign substance is stored on a stimulable phosphor sheet.

FIG 16A is a graph showing the distribution of the image signal components when the image of a foreign substance such as a lead marker is stored on a stimulable phosphor sheet. In cases where a comparatively high level of energy from scattered radiation is stored on a stimulable phosphor sheet in the region outside of an irradiation field and the image of a lead marker or the like is recorded in the same region the image density changes as shown in FIG. 16A. Specifically, the image density is generally high in the region inside of the irradiation field, and decreases sharply at a contour portion of the irradiation field. In the region outside of the irradiation field, the image density attains a certain value because of the energy stored from exposure to scattered radiation, and decreases sharply where the image of a lead marker or the like is recorded. Therefore, the differentiated values of the image signal components at the edges of the portion of the stimulable phosphor sheet where the image of a lead marker or the like is recorded approximate the differentiated values at contour points of the irradiation field.

Figure 16B:
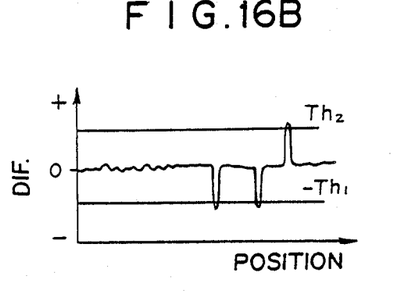
FIG. 16B is a graph showing the distribution of the difference values obtained from image signal components when the image of a foreign substance is stored on a stimulable phosphor sheet.

FIG. 16B is a graph showing the distribution of the difference values obtained from the image signal components when the image of a foreign substance such as a lead marker is stored on a stimulable phosphor sheet. In cases where the image density along a single line of a recording medium changes as shown in FIG. 16A, the differentiated values of the image signal components are distributed as shown in FIG. 16B. Specifically, the absolute values of the differentiated values are very large for image signal components corresponding to the contour points of the irradiation field where the image density changes sharply (point I in FIG. 16A), at the edge of the image of the foreign substance on the side nearer to the contour of the irradiation field (point II in FIG. 16A), and at the edge of the image of the foreign substance on the side nearer to the edge of the stimulable phosphor sheet (point III in FIG. 16A). The signs of the differentiated values may be the inverse of those shown in FIG. 16B, depending on whether the differentiation processing is carried out starting with those image signal components corresponding to the region inside of the irradiation field or starting with those components corresponding to the region outside of the irradiation field, and depending on how the differences are calculated. In any case, the differentiated value associated with point I and the differentiated value associated with point II have equal signs, and are inverse to the sign of the differentiated value associated with point III.

Therefore, as shown in FIG. 16B by way of example, point II, which is nearest to the edge of the stimulable phosphor sheet of all the points, for which the corresponding differentiated values have a negative sign and the absolute values of which exceed a first threshold value Th1, is first detected as a prospective contour point of the irradiation field. Thereafter, a judgment is made as to whether the point III, for which the corresponding differentiated value has a positive sign and the absolute value of which exceeds a second threshold value Th2, is or is not nearer to the edge of the stimulable phosphor sheet than point II. If point III is determined to be nearer to the edge than point II, it is possible to know that points II and III represent the edges of the image of the foreign substance. Therefore, in this case, a correction is made so that point I, which is second nearest to the edge of the stimulable phosphor sheet of all the points, for which the corresponding differentiated values have a negative sign and the absolute values of which exceed the first threshold value Th1, is detected as a prospective contour point of the irradiation field. In this manner, the prospective contour point of the irradiation field can be detected accurately. In cases where no image of a foreign substance has been stored in the region outside of the irradiation field, point II for which the corresponding differentiated value is very large value is not present, and therefore point I is detected originally as a prospective contour point of the irradiation field. Also, because point III is not present, point I can be accurately detected as the prospective contour point.

With the second method for detecting a prospective contour point of an irradiation field in accordance with the present invention, after a point is first detected as a prospective contour point, a judgement is made as to whether said point corresponds or does not correspond to the edge of the image of a foreign substance recorded in the region outside of the irradiation field. In cases where said point is judged to be present at an edge of the image of a foreign substance, a correction is made so that a point, which satisfies the same conditions as that said point first detected satisfies and which is present nearer to the center of the stimulable phosphor sheet than said point first detected, is detected as a prospective contour point. Therefore, an edge of the image of a foreign substance is not detected erroneously as a prospective contour point, and a prospective contour point can be detected accurately. Accordingly, the same effects can be achieved as with the first method for detecting a prospective contour point of an irradiation field in accordance with the present invention.

DESCRIPTION OF THE PREFERRED EMBODIMENTS

The present invention will hereinbelow be described in further detail with reference to the accompanying drawings.

Figure 1:
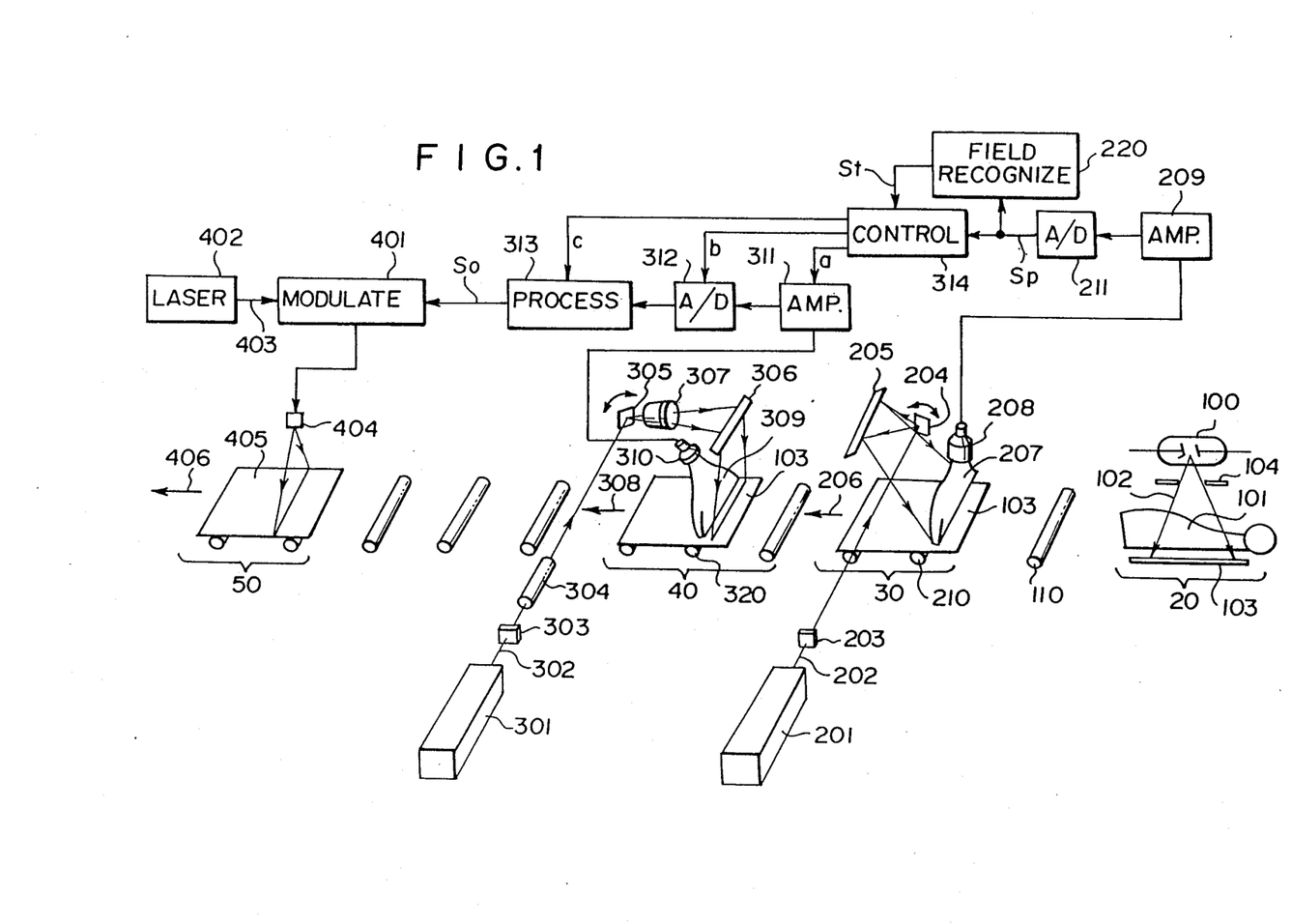
FIG. 1 is a schematic view showing a radiation image recording and reproducing system wherein an embodiment of the first method for detecting a prospective contour point of an irradiation field in accordance with the present invention is employed.

With reference to FIG. 1, a radiation image recording and reproducing system wherein an embodiment of the first method for detecting a prospective contour point of an irradiation field in accordance with the present invention is employed comprises basically a radiation image recording section 20, a preliminary read-out section 30, a final read-out section 40, and an image reproducing section 50. In the radiation image recording section 20, radiation 102 is emitted toward an object 101 by radiation source 100 constituted of an X-ray tube or the like. A stimulable phosphor sheet 103 for storing radiation energy thereon is placed at a position where it is exposed to the radiation 102 which has passed through the object 101, and a radiation image of the object 101 is stored on the stimulable phosphor sheet 103. An irradiation field stop 104 for limiting the irradiation field of the radiation 102 is disposed between the radiation source 100 and the object 101.

The stimulable phosphor sheet 103 carrying the radiation image of the object 101 stored thereon is sent to the preliminary read-out section 30 by a sheet conveyance means 110 constituted of a conveyor roller or the like. At the preliminary read-out section 30, a laser beam 202 emanating from a laser beam source 201 first passes through a filter 203 which filters out light having wavelengths within the range of wavelengths of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emanating therefrom has a wavelength distribution different from and far apart from the wavelength distribution of the light emitted by the stimulable phosphor sheet 103 when it is stimulated. While the laser beam 202 impinges upon the stimulable phosphor sheet 103, the stimulable phosphor sheet 103 is moved in the direction indicated by the arrow 206 (i.e. in the sub-scanning direction) by a sheet conveyance means 210 constituted of conveyor rollers or the like, and thus the overall surface of the stimulable phosphor sheet 103 is exposed to and scanned by the laser beam 202. The power of the laser beam source 201, the beam diameter of the laser beam 202, the speed with which the laser beam 202 scans, and the speed at which the stimulable phosphor sheet 103 moves are selected so that the level of the stimulation energy of the laser beam 202 used during the preliminary read-out is lower than the level of the stimulation energy of the laser beam used during the final read-out carried out in the final read-out section 40.

When it is exposed to the laser beam 202 as described above, the stimulable phosphor sheet 103 emits light in an amount proportional to the amount of energy stored thereon during exposure to the radiation, and the emitted light enters a light guide member 207 which may be of the shape and material disclosed in U.S. Pat. No. 4,346,295. The light is guided inside of the light guide member 207 through total reflection, emanates from a light output face of the light guide member 207 and is received by a photodetector 208 constituted of a photomultiplier or the like. The light receiving face of the photodetector 208 is positioned so that it is close contact with a filter which transmits only light having wavelengths within the range of wavelengths of light emitted by the stimulable phosphor sheet 103 and filters out light having wavelengths within the range of wavelengths of the stimulating rays, so that the photodetector 208 detects only the light emitted by the stimulable phosphor sheet 103 upon stimulation thereof. The light detected by the photodetector 208 is converted into an electric signal carrying the image input information stored on the stimulable phosphor sheet 103, and amplified by an amplifier 209. The signal generated by the amplifier 209 is digitized by an A/D converter 211, and sent as a preliminary read-out image signal Sp to a final read-out control circuit 314 in the final read-out section 40. On the basis of the image input information which the preliminary read-out image signal Sp represents, the final read-out control circuit 314 calculates a read-out gain setting value (a), a scale factor setting value (b), and a reproduced image processing condition setting value (c). The preliminary read-out image signal Sp is also sent to an irradiation field recognition circuit 220 which will be described in detail later.

After the preliminary read-out from the stimulable phosphor sheet 103 is finished, the stimulable phosphor sheet 103 is sent to the final read-out section 40. In this section, a laser beam 302 emanating from a laser beam source 301 first passes through a filter 303 which filters out light having wavelengths within the range of the wavelengths of light emitted by the stimulable phosphor sheet 103 upon stimulation thereof by the laser beam 302. Then, the beam diameter of the laser beam 302 is precisely adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 an $f\theta$ lens 307 is disposed for keeping the beam diameter of the laser beam 302 uniform as it scans the stimulable phosphor sheet 103. While the laser beam 302 impinges upon the stimulable phosphor sheet 103, the stimulable phosphor sheet 103 is moved in the direction indicated by the arrow 308 (i.e. in the sub-scanning direction) by a sheet conveyance means 320 constituted of conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the amount of energy stored thereon during exposure to radiation, and the light emitted enters a light guide member 309 which is made of the same material and has the same configuration as the light guide member 207 used for the preliminary read-out. The light emitted by the stimulable phosphor sheet 103 is guided inside of the light guide member 309 through repeated total reflection, emanates from the light output face of the light guide member 309 and is received by a photodetector 310 constituted of a photomultiplier or the like. The light receiving face of the photodetector 310 is positioned in close contact with a filter which selectively transmits only the light having wavelengths within the range of wavelengths of light emitted by the stimulable phosphor sheet 103, so that the photodetector 310 detects only the light emitted thereby.

The output of the photodetector 310, which photoelectrically detects the light emission representing the radiation image stored on the stimulable phosphor sheet 103, is amplified to an appropriate level by an amplifier 311. The gain of the amplifier 311 is adjusted on the basis of the read-out gain setting value (a) calculated by the control circuit 314. The amplified electric signal is fed into an A/D converter 312 which converts the electric signal into a digital signal by use of a scale factor which is adjusted by the scale factor setting value (b) to suit the width in the fluctuation of the values of the signal. The digital signal thus obtained is fed into a signal processing circuit 313, in which it is subjected to signal processing (image processing), the nature of which signal processing is based on the reproduced image processing condition setting value (c). After the digital signal is processed, a visible radiation image is obtained which is suitable for viewing, particularly for diagnostic purposes.

The processed digital signal is output as a read-out image signal (a final read-out image signal) So. The final read-out image signal So generated by the signal processing circuit 313 is fed into a light modulator 401 in the image reproducing section 50. In the image reproducing section 50, a laser beam 403 emanating from a reproducing laser beam source 402 is modulated by the light modulator 401 on the basis of the final read out image signal So received from the signal processing circuit 313, and is made to impinge upon a photosensitive material 405 such as photographic film by a scanning mirror 404 which causes the laser beam 403 to scan the photosensitive material 405. At this time, the photosensitive material 405 is moved in a direction normal to the aforesaid scanning direction, i.e. in the direction indicated by the arrow 406. Accordingly, the radiation image represented by the final read-out image signal So is recorded on the photosensitive material 405. To reproduce the radiation image, it is possible to use any other appropriate method such as the aforesaid method using a CRT display unit.

Figure 5:
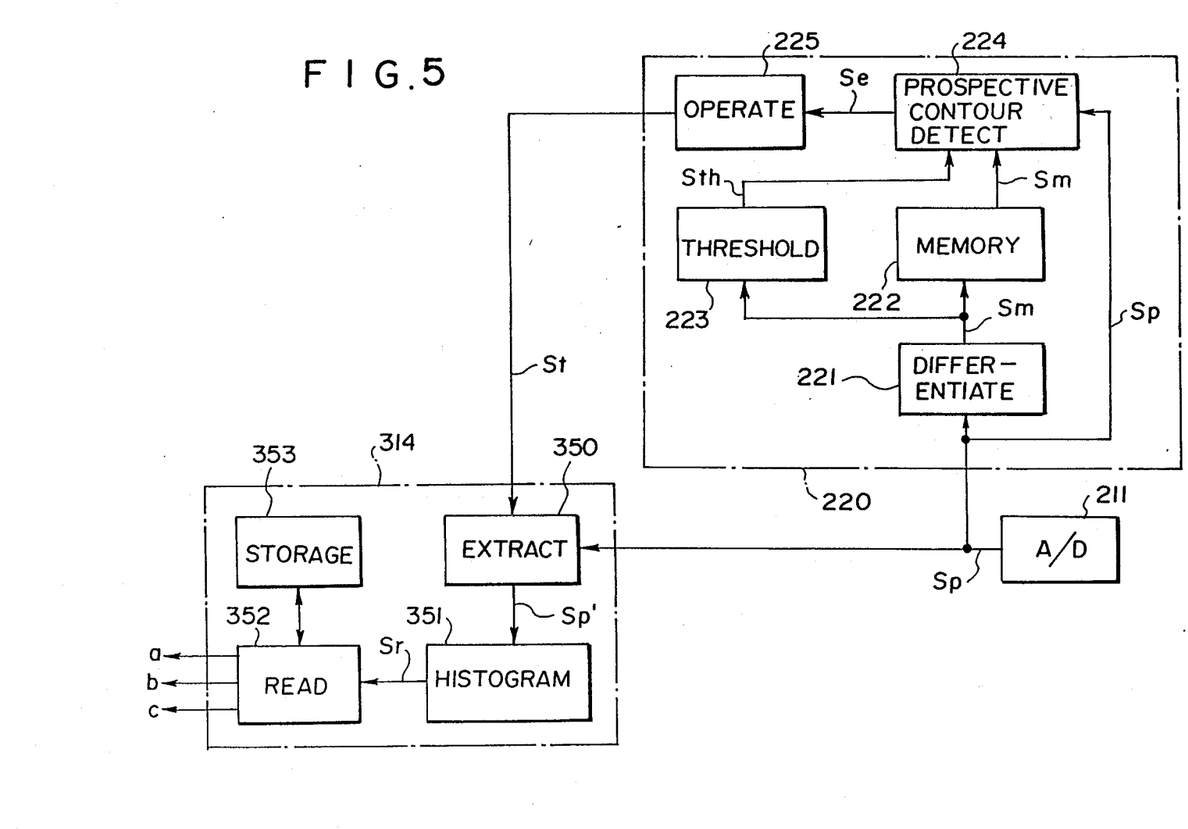
FIG. 5 is a block diagram showing part of the radiation image recording and reproducing system shown in FIG. 1.

A technique for accurately adjusting the read-out gain setting value (a), the scale factor setting value (b) and the image processing condition setting value (c) when the irradiation field B on the stimulable phosphor sheet 103 is limited as shown in FIG. 2 will hereinbelow be described with reference to FIG. 5. As shown in FIG. 5, the control circuit 314 comprises a signal extracting section 350, a histogram analysis section 351, a read section 352, and a storage section 353. The aforesaid preliminary read-out image signal Sp is fed into the signal extracting section 350 which extracts a preliminary read-out image signal Sp' only within a specified region as will be described later. The preliminary read-out image signal Sp' is sent from the signal extracting section 350 to the histogram analysis section 351. The histogram analysis section 351 creates a histogram of the preliminary read-out image signal Sp', calculates the maximum value of the signal, the minimum value of the signal, the signal value which occurs most often, i.e. the signal value corresponding to the maximum value of the histogram, or the like, and feeds a signal Sr representing the calculated value into the read section 352. The storage section 353 stores the read-out gain setting value (a), the scale factor setting value (b), and the image processing condition setting value (c) suitable for the aforesaid maximum value, minimum value, signal value which occurs most often, or the like. The read section 352 reads the setting values (a), (b) and (c) suitable for the signal Sr from the storage section 353, and feeds them respectively into the amplifier 311, the A/D converter 312, and the signal processing circuit 313.

Figure 3:
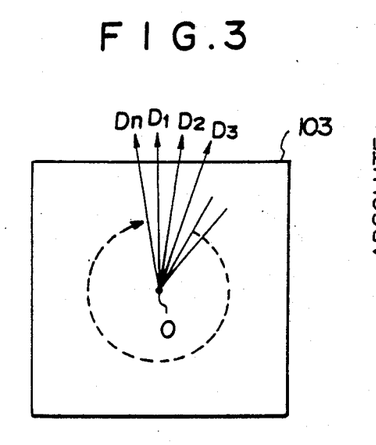
FIG. 3 is an explanatory view showing how the differentiation processing can be carried out in the first method for detecting a prospective contour point of an irradiation field in accordance with the present invention.
Figure 4A:
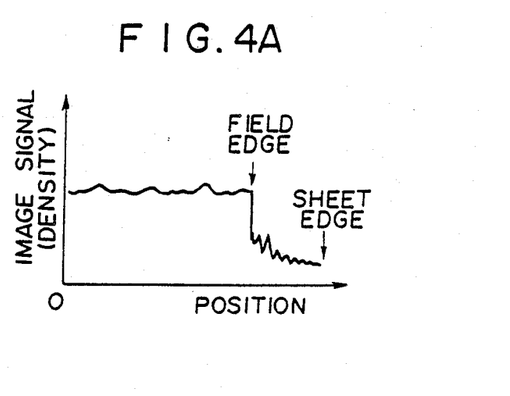
FIG. 4A is a graph showing the distribution of image signal components in the first method for detecting a prospective contour point of an irradiation field in accordance with the present invention.
Figure 4B:
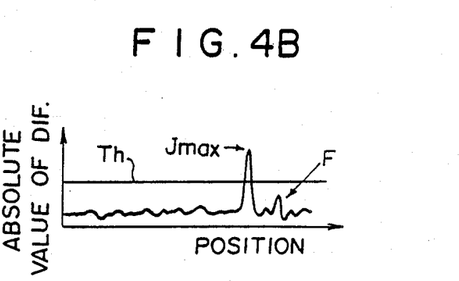
FIG. 4B is a graph showing the distribution of the absolute values of the differences between neighboring image signal components in the first method for detecting a prospective contour point of an irradiation field in accordance with the present invention.

How the signal extracting section 350 extracts a signal will now be described below. The irradiation field recognizing circuit 220 is composed of a differentiation processing section 221, a memory 222, a threshold value adjusting section 223, a prospective contour point signal detecting section 224, and an operating section 225. The preliminary read-out image signal Sp is fed into the differentiation processing section 221 and the prospective contour point signal detecting section 224. The differentiation processing section 221 differentiates the components of the preliminary read-out image signal Sp corresponding to positions on the stimulable phosphor sheet 103 located along a line in the direction of D1, then along lines in the directions D2, D3, . . . , Dn shown in FIG. 3. Lines along the directions D1 through Dn radiate from the center O of the stimulable phosphor sheet 103 toward the edges thereof. In this embodiment, lines along the directions D1 through Dn radiate at equal angle intervals. For example, if the size of the stimulable phosphor sheet 103 is 256 mm × 192 mm, approximately 64 directions are selected as the directions D1 through Dn. Differentiation processing is carried out, and the differences among image signal components of the preliminary read-out image signal Sp corresponding to adjacent positions on the stimulable phosphor sheet are calculated. A signal Sm representing the differences is stored in the memory 222, and fed into the threshold value adjusting section 223. From the signal Sm, the threshold value adjusting section 223 detects the maximum value Jmax of the absolute values of the differences of the preliminary read-out image signal components corresponding to positions located along lines in each of the directions D1 through Dn. The threshold value adjusting section 223 then adjusts the threshold value Th to be, for example, one half of the maximum value Jmax, and feeds a signal Sth representing the adjusted threshold value Th into the prospective contour point signal detecting section 224. The prospective contour point signal detecting section 224 also reads the signal Sm, which represents the aforesaid differences, from the memory 222. Based on the signal Sm representing the differences and the signal Sth representing the threshold value Th, the prospective contour point signal detecting section 224 detects a prospective contour point which is considered to be present on a contour of the irradiation field B on the stimulable phosphor sheet 103. Specifically, the levels of the image signal components of the preliminary read-out image signal Sp for the region inside of the irradiation field B are distinctly higher than those for the region outside of the irradiation field B. Therefore, the values of the image signal components of the preliminary read-out image signal Sp corresponding to positions on the stimulable phosphor sheet located along a line in a certain direction Di are distributed as shown in FIG. 4A. Accordingly, as shown in FIG. 4B, the absolute values of the differences of adjacent aforesaid image signal components change markedly at an edge of an irradiation field. The prospective contour point signal detecting section 224 detects a point, at which the absolute value of a difference exceeds the threshold value Th, as a prospective contour point. The region outside of the irradiation field B on the stimulable phosphor sheet 103 was exposed to radiation 102 scattered by the object 101 during the image recording step. Therefore, as indicated by the arrow F in FIG. 4B, the absolute values of the differences between the image signal components of the preliminary read-out image signal Sp in the region outside of the irradiation field B may be comparatively large. However, such comparatively large absolute values of the differences are distinctly smaller than the absolute value of the difference between image signal components representing the edge of the irradiation field B. Accordingly, when the threshold value Th is adjusted to be one half of the maximum value Jmax of the absolute values of the differences as described above, the absolute value of a difference exceeds the threshold value Th only when it is associated with the edge of the irradiation field B, and a prospective contour point can be detected accurately.

Thereafter, the prospective contour point signal detecting section 224 extracts image signal components at prospective contour points, which have been detected in the manner described above, from the preliminary read-out image signal Sp. The prospective contour point signal detecting section 224 finds the positions of picture elements, respectively corresponding to the extracted image signal components, and feeds a signal Se representing the positions of the picture elements into the operating section 225. Most of the image signal components extracted from the preliminary read-out image signal Sp constitute an image signal, which represents the contour of the irradiation field B on the stimulable phosphor sheet 103 as shown in FIG. 2. In this embodiment, as shown in FIG. 2, the positions of the picture elements are expressed on an x-y orthogonal coordinate system on the stimulable phosphor sheet 103.

After the prospective contour points are detected in the manner described above, lines connecting them may be recognized as the contour of the irradiation field B. The lines connecting the prospective contour points can be found by using one of several methods, for example, a method wherein prospective contour points remaining after a smoothing process has been carried out are connected together, a method wherein a plurality of straight lines are found by locally applying the method of least squares and the straight lines are then connected together, or a method wherein a spline curve or the like is applied. In this embodiment, the operating section 225 finds a plurality of straight lines connecting the prospective contour points by utilizing a Hough transformation.

The processing done to find the straight lines will hereinbelow be described in detail.

Figure 6:
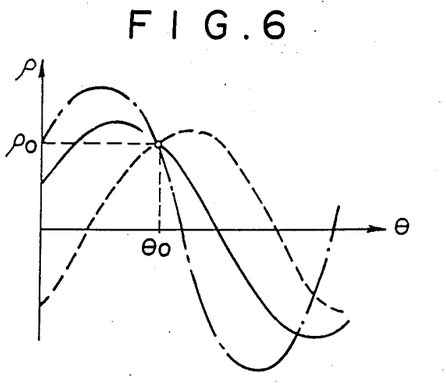
FIG. 6 is an explanatory graph showing a method for detecting straight lines which connect prospective contour points of an irradiation field.

If (xo,yo) are the coordinates of the picture element positions (the prospective contour points) which the signal Se represents, then the operating section 225 calculates the curves expressed as $$\rho = xo \cos\theta + yo \sin\theta$$

xo and yo being constant for each prospective contour point coordinate (xo,yo). FIG. 6 shows the curves thus obtained, and the number of curves equals the number of prospective contour point coordinates (xo,yo).

Then, the operating section 225 calculates the coordinates ($\rho o, \theta o$) of the points where the curves intersect and where the number of curves intersecting at each point ($\rho o, \theta o$) is not smaller than a predetermined number Q. Because of errors in finding the prospective contour point coordinates (xo,yo), many curves rarely intersect exactly at a single point. Therefore, by way of example, in the case where multiple sets of two curves have intersections spaced from one another by only small distances not longer than a predetermined distance, the point of intersection at the middle of the group of the intersections is taken as the aforesaid intersection ($\rho o, \theta o$). Then, from each intersection ($\rho o, \theta o$), the operating section 225 calculates a straight line expressed as $$\rho o = x \cos\theta o + y \sin\theta o$$

on the x-y orthogonal coordinate system. The straight line thus calculated extends along a plurality of the prospective contour point coordinates (xo,yo). It often occurs that bone edges or other image portions at which the image density changes sharply in the irradiation field B are also detected as prospective contour points. Therefore, as shown in FIG. 2, there is the risk that a straight line such as L will connect points where the image density changes sharply but which are not contour points with points actually on the contour of the irradiation field. However, if the aforesaid predetermined number Q is made substantially large (for example, 20 or larger), the straight line L is not obtained. Instead only straight lines representing the contour of the irradiation field are obtained.

Figure 7:
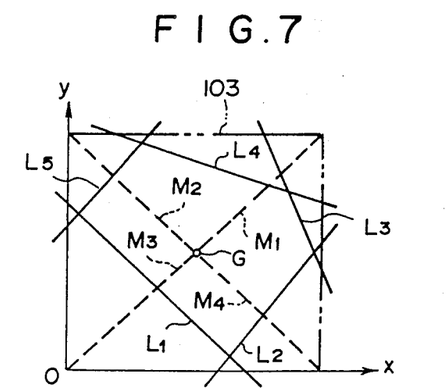
FIG. 7 is an explanatory view showing a method for extracting a region surrounded by straight lines which connect prospective contour points of an irradiation field.

In cases where the prospective contour points are distributed as shown in FIG. 2, straight lines as shown in FIG. 7 are obtained. The operating section 225 then detects the region surrounded by a plurality of straight lines L1, L2, L3, ..., Ln obtained in this manner, and recognizes said region as the irradiation field B. Specifically, for example, the region is recognized in the manner described below. The operating section 225 stores line segments M1, M2, M3, ..., Mm connecting the corners of the stimulable phosphor sheet 103 with the center point G (four line segments in cases where the stimulable phosphor sheet 103 is rectangular), and detects whether or not each of the line segments M1 to Mm intersects with each of the straight lines L1 to Ln. In cases where an intersection is present, the operating section 225 divides the stimulable phosphor sheet 103 into two regions: one including the corner of the stimulable phosphor sheet 103 to which the line segment is connected and delineated by the straight line and the other including the remainder of the stimulable phosphor sheet. The operating section 225 then discards the region including the corner. This operation is carried out for all of the straight lines L1 to Ln and the line segments M1 to Mm, and the region surrounded by the straight lines L1 to Ln is not discarded. The region thus obtained is recognized as the irradiation field B.

The operating section 225 sends a signal St representing the shape and location of the irradiation field B recognized in the manner described above to the signal extracting section 350 in the final read-out control circuit 314. The signal extracting section 350 extracts the image signal components corresponding to the region, which the signal St represents, from the preliminary read-out image signal Sp, and sends the preliminary read-out image signal Sp' comprising the extracted image signal components to the histogram analysis section 351. Therefore, the histogram analysis section 351 carries out an analysis of the histogram of only those image signal components representing the region of the stimulable phosphor sheet 103 that was actually exposed to radiation, and the aforesaid setting values (a), (b) and (c) are made suitable for the actual image input information.

In the aforesaid embodiment, differentiation processing is started on image signal components representing image information stored at positions neighboring the center point O of the stimulable phosphor sheet 103 in the region inside of the irradiation field B. However, differentiation processing may be started on image signal components representing image information stored at any position as long as the starting point lies on the stimulable phosphor sheet 103. For example, in cases where the irradiation field is limited to a very small area, the center point of the stimulable phosphor sheet may be present in the region outside of the irradiation field. In such cases, differentiation processing may be started on image signal components representing image information present at positions of the stimulable phosphor sheet 103 which lie in the region inside of the irradiation field, for example, a position at which the density level is the highest among density levels on the stimulable phosphor sheet, a position at which the center of gravity of the density is located, or a position at which the center of gravity in the region on a high density side is located when the image density levels are converted into the two-valued system.

Hereinafter, the term "directions of differentiation processing" means the directions of the lines along which positions on the stimulable phosphor sheet lie, the image signal components representing the image information at said positions undergoing differentiation processing starting with the image signal components representing image information at positions at one end of the line.

Figure 8:
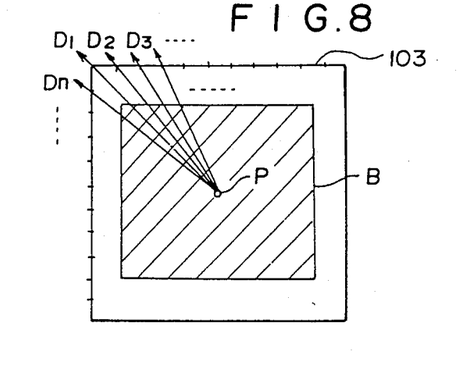
FIGS. 8, 9, 10, 11 and 12 are explanatory views showing examples of how the differentiation processing can be carried out in the first method for detecting a prospective contour point of an irradiation field in accordance with the present invention.

The directions D1 through Dn of differentiation processing need not necessarily be selected at equal angle intervals. For example, as shown in FIG. 8, a plurality of points which lie at equal distance intervals along edge portions of the stimulable phosphor sheet 103 may be selected, and directions D1 through Dn from a point P inside of the irradiation field B toward the plurality of said points may be selected as the directions of differentiation processing.

Figure 9:
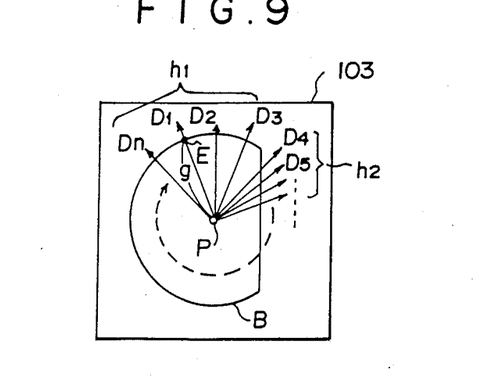

Furthermore, as shown in FIG. 9, the directions D of differentiation processing may have larger intervals between them in a region where the distance g between a point P inside of the irradiation field B and a prospective contour point E does not change very much, i.e. in the region corresponding to a region h1. In a region where the distance g changes markedly, i.e. in the region corresponding to a range h2, the directions D of differentiation processing may have smaller intervals between them.

In general, the preliminary read-out described above is carried out for picture elements which are larger than those of the final read-out. Differentiation processing may be carried out on image signal components obtained by such a comparatively rough read-out operation. Alternatively, the image signal components may be interpolated to obtain image signal components representing picture elements of a finer resolution, and differentiation processing may be carried out for this larger number of image signal components. Also, differentiation processing may be conducted for image signal components obtained by averaging the values of the image signal components detected at a plurality of picture elements.

Figure 10:
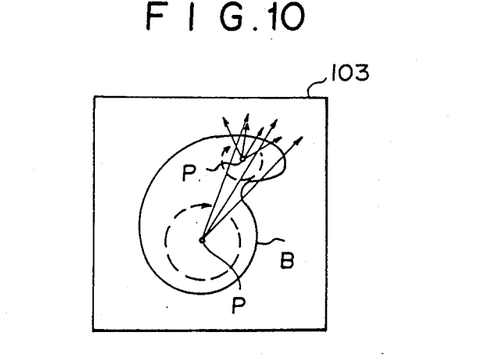
Figure 11:
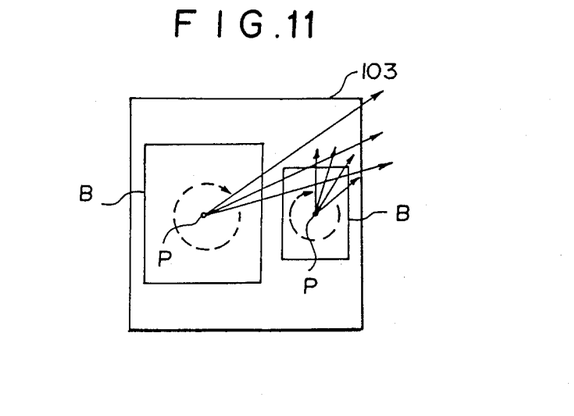
Figure 12:
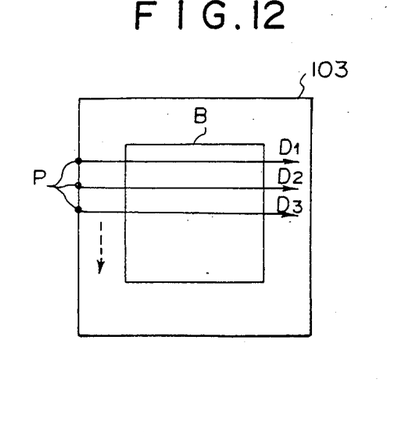

In cases where an irradiation field B having the shape shown in FIG. 2 is to be recognized, a single prospective contour point on a contour of the irradiation field is generally detected for a single direction of differentiation processing. On the other hand, in cases where an irradiation field B having the shape shown in FIG. 10 or FIG. 11 is to be recognized, a plurality of prospective contour points on the contour of the irradiation field may be detected for a single direction of differentiation processing. In such cases, when all of the points at which the absolute values of the aforesaid differences exceed the threshold value are detected as prospective contour points, the prospective contour points on the contour of the irradiation field can be detected completely, and an irradiation field B having a complicated shape can be recognized accurately. Also, as shown in FIG. 12, in cases where the shape of the irradiation field B is rectangular, differentiation processing may be carried out by shifting the point P at which differentiation processing is started.

In the aforesaid embodiment, the threshold values Th are calculated for each direction of differentiation processing based on the maximum value among the absolute values of differences (differentiated values) of the image signal components. Alternatively, the characteristic values such as the maximum values may be classified into several classes, and the threshold values may be fixed for the respective classes and stored in a table. One of the threshold values may be read from the table in accordance with the characteristic value actually calculated, and put into use.

Figure 15:
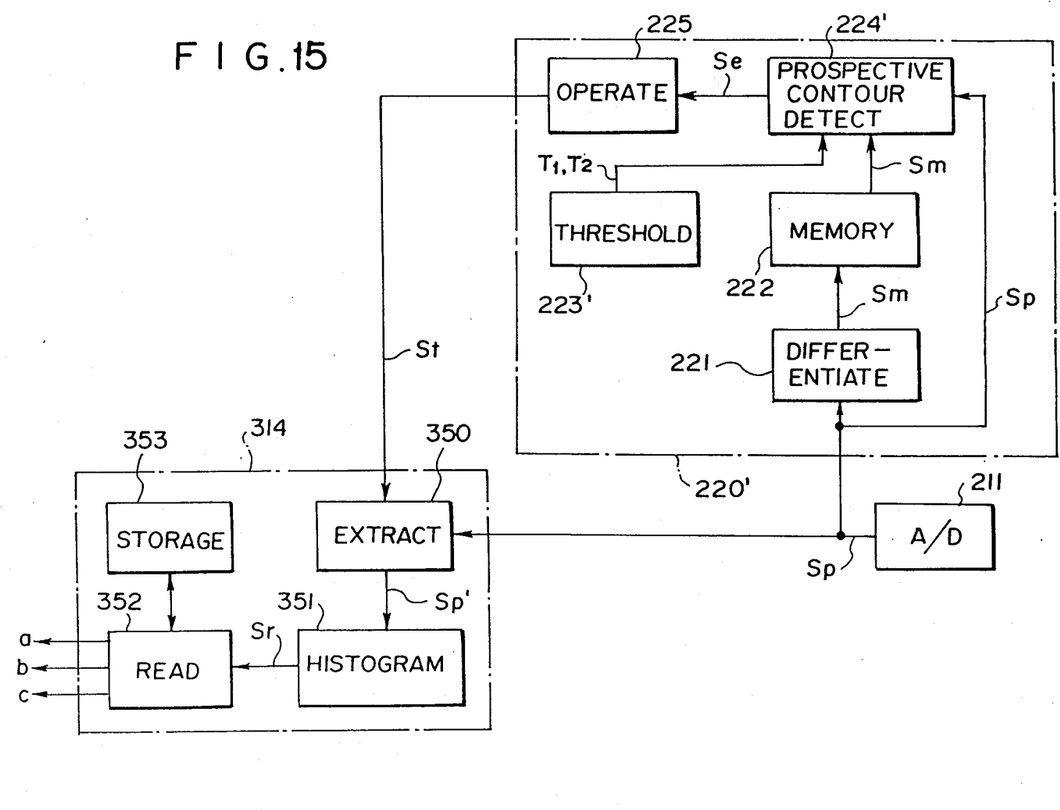
FIG. 15 is a block diagram showing part of the radiation image recording and reproducing system shown in FIG. 1, wherein an embodiment of the second method for detecting a prospective contour point of an irradiation field in accordance with the present invention is employed.

An embodiment of the second method for detecting a prospective contour point of an irradiation field in accordance with the present invention will be described hereinbelow with reference to FIG. 15. In FIG. 15, similar elements are numbered with the same reference numerals with respect to FIG. 5.

With reference to FIG. 15, an irradiation field recognizing circuit 220' is composed of the differentiation processing section 221, the memory 222, a threshold value adjusting section 223', a prospective contour point signal detecting section 224', and the operating section 225. The preliminary read-out image signal Sp is fed into the differentiation processing section 221 and the prospective contour point signal detecting section 224'. The differentiation processing section 221 differentiates the preliminary read-out image signal Sp, which has been digitized, along a direction D1, then along directions D2, D3, . . . , Dn shown in FIG. 13. The lines in the directions D1 through Dn radiate from a center O of the stimulable phosphor sheet 103 toward the edges thereof. In this embodiment, the directions D1 through Dn lie at equal angle intervals. For example, when the size of the stimulable phosphor sheet 103 is 256 mm×192 mm, approximately 64 directions are selected as the directions D1 through Dn. By carrying out differentiation processing, the differences among image signal components of the preliminary read-out image signal Sp representing adjacent positions on the stimulable phosphor sheet are calculated. The signal Sm representing the differences is stored in the memory 222. The prospective contour point signal detecting section 224' reads the signal Sm from the memory 222, and receives a signal T1, which represents a first threshold value Th1, from the threshold value adjusting section 223'. Based on the signal Sm representing the differences and the signal T1 representing the first threshold value Th1, the prospective contour point signal detecting section 224' detects a prospective contour point which is considered to be present on a contour of the irradiation field B on the stimulable phosphor sheet 103. Specifically, the levels of the image signal components of the preliminary read-out image signal Sp representing image information at positions in the region inside of the irradiation field B are distinctly higher than those representing image information at positions in the region outside of the irradiation field B. Therefore, the values of the image signal components of the preliminary read-out image signal Sp along a certain direction Di are distributed as shown in FIG. 14A. Accordingly, as shown in FIG. 14B, the absolute values of the aforesaid differences change markedly at an edge of an irradiation field. The prospective contour point signal detecting section 224' detects the point nearest to the edge of the stimulable phosphor sheet 103 among the points, for which the corresponding differences have a negative sign and the absolute values of which exceed the first threshold value Th1, as a prospective contour point. Thereafter, the prospective contour point signal detecting section 224' judges whether a point, for which the corresponding difference has a positive value and the absolute value of which exceeds a second threshold value Th2, is or is not present nearer to the edge of the stimulable phosphor sheet 103 than point I which was detected as a prospective contour point in the aforesaid process. The second threshold value Th2 is represented by a signal T2 received from the threshold value adjusting section 223'. In cases where no image of a foreign substance has been recorded in the region outside of the irradiation field B, the image signal components in the region outside of the irradiation field B are distributed as shown in FIG. 14A. Therefore, there is no point at which the absolute value of the corresponding difference exceeds the second threshold value Th2. In this case, the prospective contour point signal detecting section 224' detects point I directly as the prospective contour point.

Figure 13:
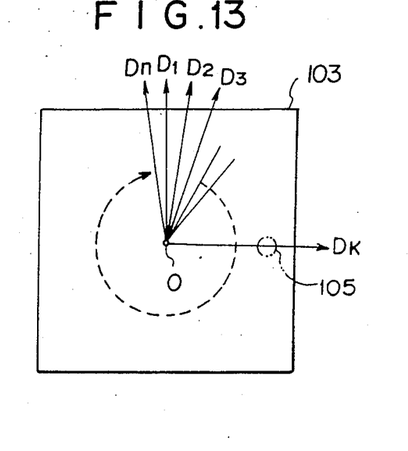
FIG. 13 is an explanatory view showing how the differentiation processing can be carried out in the second method for detecting a prospective contour point of an irradiation field in accordance with the present invention.
Figure 14A:
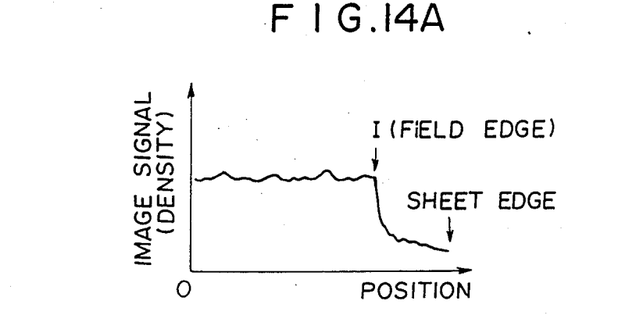
FIG. 14A is a graph showing the distribution of image signal components in the second method for detecting a prospective contour point of an irradiation field in accordance with the present invention.
Figure 14B:
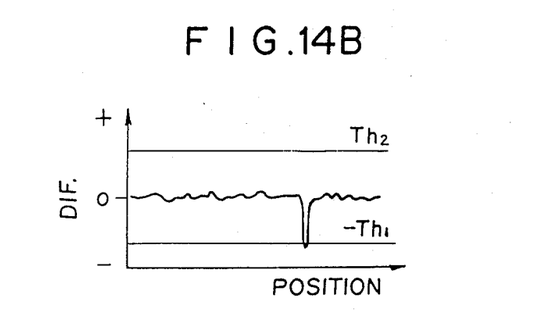
FIG. 14B is a graph showing the distribution of the difference values obtained from image signal components in the second method for detecting a prospective contour point of an irradiation field in accordance with the present invention.

On the other hand, as shown in FIG. 13, the image of a foreign substance 105 such as a lead marker is often recorded on a line extending along a direction Dk in the region outside of the irradiation field. In such cases, the image signal components of the preliminary read-out image signal Sp along the direction Dk are distributed as shown in FIG. 16A. The prospective contour point signal detecting section 224' first detects the point II shown in FIG. 16A by the aforesaid process. The point II corresponds to the edge of the image of the foreign substance 105 on the the side nearer to the irradiation field B. Thereafter, in the manner described above, the prospective contour point signal detecting section 224' judges whether a point, for which the corresponding difference has a positive value and the absolute value of which exceeds the second threshold value Th2, is or is not present nearer to the edge of the stimulable phosphor sheet 103 than point II. In the present case, such a point is judged to be present. Specifically, such a point is present at point III at the edge of the image of the foreign substance 105 on the side nearer to the edge of the stimulable phosphor sheet 103. When point III is judged to be present, the prospective contour point signal detecting section 224' cancels point II which was first detected as a prospective contour point, and detects point I, the point second nearest to the edge of the stimulable phosphor sheet 103 among the points, for which the corresponding differences have negative values and the absolute values of which exceed the first threshold value Th1 as in the case of point II, as a prospective contour point. In this manner, a prospective contour point can be detected accurately by eliminating the problem of an edge of the image of the foreign substance 105 being detected incorrectly as a prospective contour point.

In the embodiment shown in FIG. 15, the signal Sm representing the differences is stored in the memory 222, and is then read therefrom when the points I, II and III are to be detected. Alternatively, the memory 222 may be omitted, and differentiation processing may be carried out repeatedly in the appropriate direction each time the point I, II or III is to be detected.

Thereafter, the prospective contour point signal detecting section 224' extracts the image signal components which correspond to the prospective contour points, which have been detected in the manner described above, from the preliminary read-out image signal Sp. The prospective contour point signal detecting section 224' finds the positions of picture elements respectively corresponding to the extracted image signal components, and feeds a signal Se representing the positions of the picture elements into the operating section 225. Most of the image signal components extracted from the preliminary read-out image signal Sp constitute an image signal, which represents the edges of the irradiation field B on the stimulable phosphor sheet 103 as shown in FIG. 2. In this embodiment, as shown in FIG. 2, the positions of the picture elements are expressed on an x-y orthogonal coordinate system on the stimulable phosphor sheet 103.

After the prospective contour points are detected in the manner described above, lines are connected to them, and the contour of the irradiation field B is recognized.

As described above, in cases where the shape of the irradiation field B is rectangular, differentiation processing may be carried out by shifting the point P, at which differentiation processing is started, as shown in FIG. 12. In this case, the difference values corresponding to points on the contour of the irradiation field on the left and right edges of the stimulable phosphor sheet 103 have opposite signs. At points on the contour of the irradiation field for which the corresponding difference has a positive value, the prospective contour point signal detecting section 224' first detects the point nearest to the edge of the stimulable phosphor sheet 103 among the points, for which the corresponding differences have a positive sign and the absolute values of which exceed a first threshold value, as a prospective contour point. Thereafter, the prospective contour point signal detecting section 224' judges whether a point, for which the corresponding difference has a negative value and the absolute value of which exceeds a second threshold value, is or is not present nearer to the edge of the stimulable phosphor sheet 103 than the point which was detected as a prospective contour point in the aforesaid process. If the point, for which the corresponding difference has a negative value and the absolute value of which difference exceeds a second threshold value, is nearer to the edge of the stimulable phosphor sheet 103, the prospective contour point signal detecting section 224' makes a correction so that the point second nearest to the edge of the stimulable phosphor sheet 103 among the points, which satisfy the same conditions as those satisfied by the point which was detected as a prospective contour point in the aforesaid process, is detected as a prospective contour point.

In the embodiments of the first and second methods for detecting a prospective contour point of an irradiation field in accordance with the present invention, when the irradiation field on the stimulable phosphor sheet 103 is not limited, the signal St generated by the operating section 225 represents the overall region of the stimulable phosphor sheet 103. Therefore, the setting values (a), (b) and (c) can still be adjusted to appropriate values. However, in order to prevent the irradiation field recognizing circuit 220 or 220' from carrying out unnecessary processing in this case, a switch for turning the operation of the irradiation field recognizing circuit 220 or 220' on and off should preferably be provided, and the signal extracting section 350 should preferably be constituted so as to pass all the preliminary read-out image signal Sp therethrough when the irradiation field recognizing circuit 220 or 220' is off. With this configuration, in cases where it is known in advance that image read-out is carried out from a stimulable phosphor sheet 103 on which a radiation image has been stored without limiting the irradiation field, all of the preliminary read-out image signal Sp can be quickly fed to the histogram analysis section 351.

The region over which image read-out is carried out in the final read-out section 40 may be controlled based on the signal St which represents the irradiation field B and which is generated by the irradiation field recognizing circuit 220 to 220'. In such cases, the final read-out is carried out only over the irradiation field B on the stimulable phosphor sheet 103, and the read-out processing speed becomes high.

In the radiation image recording and reproducing system shown in FIG. 1, the preliminary read-out section and the final read-out section are disposed independently. However, as disclosed in, for example, U.S. Pat. No. 4,527,060, a single read-out system may be used for the preliminary read-out and the final read-out. In this case, after the preliminary read-out is finished, the stimulable phosphor sheet is returned to the read-out system by a sheet conveyance means and then the final read-out is carried out. During the preliminary read-out, the stimulation energy of the stimulating rays is adjusted by a stimulating energy adjusting means to be lower thana the stimulation energy of the stimulating rays used in the final read-out. The first and second methods for detecting a prospective contour point of an irradiation field in accordance with the present invention are also applicable to such cases.

Also, instead of recognizing an irradiation field based on the preliminary read-out image signal, a prospective contour point of an irradiation field may be recognized by utilizing the final read-out image signal or an image signal, which is obtained by directly carrying out an image read-out process corresponding to a final read-out process without first conducting preliminary read-out. In this case, information on the recognized irradiation field can be utilized for, for example, adjusting the image processing condition setting value (c).

Furthermore, the first and second methods for detecting a prospective contour point of an irradiation field in accordance with the present invention are also applicable to cases where a radiation image is read out from a recording medium such as silver halide photographic film on which an X-ray image has been recorded.

I claim:

1. A method for detecting a prospective contour point of an irradiation field, which comprises the steps of:
   (i) detecting an image signal representing a radiation image from a recording medium which has been exposed to radiation over a limited irradiation field in order to record the radiation image thereon,
   (ii) sampling and digitizing the image signal to obtain digital image signal components representing the image information at respective positions on said recording medium,
   (iii) calculating a characteristic value which represents the characteristics of the distribution of the values of the digital image signal components corresponding to positions located along each line on said recording medium,
   (iv) adjusting a predetermined threshold value for each line on said recording medium on the basis of a corresponding characteristic value,
   (v) carrying out differentiation processing on the digital image signal components corresponding to positions located along each line on said recording medium, and
   (vi) finding the absolute value among the values resulting from the carrying out of the differentiation processing on said digital image signal components which exceeds a corresponding threshold value and detecting the point on each line of said recording medium associated with the absolute value exceeding said corresponding threshold value as a prospective contour point of the irradiation field.

2. A method as defined in claim 1 wherein said recording medium is a stimulable phosphor sheet on which a radiation image has been stored, and said image signal is detected by exposing said stimulable phosphor sheet to stimulating rays which cause it to emit light in proportion to the amount of energy stored thereon during exposure to radiation, and photoelectrically detecting the emitted light.

3. A method as defined in claim 1 wherein said image signal is obtained from a preliminary read-out.

4. A method for detecting a prospective contour point of an irradiation field, which comprises the steps of:
   (i) detecting an image signal representing a radiation image from a recording medium which has been exposed to radiation over a limited irradiation field in order to record the radiation image thereon,
   (ii) from said image signal, detecting digital image signal components at respective positions on said recording medium,
   (iii) carrying out differentiation processing on the digital image signal components corresponding to positions located along a single line on said recording medium, (iv) detecting the point nearest to an edge of said recording medium among the points, associated with differentiated values obtained from the differentiation processing, which differentiated values have a predetermined positive or negative sign and the absolute values of which exceed a first threshold value, as a prospective contour point of the irradiation field, (v) judging whether a point, associated with a differentiated value having a sign inverse to said predetermined sign and the absolute value of which exceeds a second threshold value, is or is not nearer to said edge of said recording medium along single said line than said point which has been detected as a prospective contour point of the irradiation field, and (vi) in cases where the point, for which the corresponding differentiated value has a sign inverse to said predetermined sign and the absolute value of which differentiated value exceeds a second threshold value, is judged to be nearer to said edge, making a correction so that the point second nearest to said edge of said recording medium among the points for which the corresponding differentiated values obtained from the differentiation processing have said predetermined sign and the absolute values of which differentiated values exceed said first threshold value, is detected as a prospective contour point of the irradiation field.

5. A method as defined in claim 4 wherein said recording medium is a stimulable phosphor sheet on which a radiation image has been stored, and said image signal is detected by exposing said stimulable phosphor sheet to stimulating rays which cause it to emit light in proportion to the amount of energy stored thereon during exposure to radiation, and photoelectrically detecting the emitted light.

6. A method as defined in claim 4 wherein said image signal is obtained from a preliminary read-out.

* * * * *